(12) United States Patent
Park

(10) Patent No.: US 11,605,073 B2
(45) Date of Patent: Mar. 14, 2023

(54) PAYMENT METHOD USING ONE-TIME PAYMENT SECURITY CODE BASED ON COLOR PIXEL CODE

(71) Applicant: Hee Young Park, Seoul (KR)

(72) Inventor: Hee Young Park, Seoul (KR)

(*) Notice: Subject to any disclaimer, the term of this patent is extended or adjusted under 35 U.S.C. 154(b) by 6 days.

(21) Appl. No.: 16/912,392

(22) Filed: Jun. 25, 2020

(65) Prior Publication Data
US 2021/0334793 A1    Oct. 28, 2021

(30) Foreign Application Priority Data

Apr. 27, 2020    (KR) .................. 10-2020-0050692

(51) Int. Cl.
| | |
|---|---|
| *G06Q 20/38* | (2012.01) |
| *G06Q 20/20* | (2012.01) |
| *G06Q 20/32* | (2012.01) |
| *G06Q 20/40* | (2012.01) |
| *G06Q 30/02* | (2012.01) |
| *G06Q 30/0251* | (2023.01) |
| *G06V 10/22* | (2022.01) |

(52) U.S. Cl.
CPC ......... *G06Q 20/385* (2013.01); *G06Q 20/202* (2013.01); *G06Q 20/204* (2013.01); *G06Q 20/209* (2013.01); *G06Q 20/3274* (2013.01); *G06Q 20/3278* (2013.01); *G06Q 20/401* (2013.01); *G06Q 30/0268* (2013.01); *G06Q 20/326* (2020.05); *G06V 10/235* (2022.01)

(58) Field of Classification Search
CPC . H04L 63/0838; H04L 9/0872; G06Q 20/045; G06Q 20/28
See application file for complete search history.

(56) References Cited

U.S. PATENT DOCUMENTS

| | | | | |
|---|---|---|---|---|
| 10,313,332 | B2* | 6/2019 | Hong .................. | H04L 63/0838 |
| 10,552,846 | B2* | 2/2020 | Caton .................. | G06Q 20/204 |
| 2011/0231270 | A1* | 9/2011 | Dykes .................... | G06Q 20/10 |
| | | | | 705/16 |
| 2013/0268775 | A1* | 10/2013 | Hawkins ............... | H04L 9/0872 |
| | | | | 713/189 |
| 2014/0229379 | A1* | 8/2014 | Jang ....................... | G06Q 20/28 |
| | | | | 705/44 |
| 2014/0244494 | A1* | 8/2014 | Davis ..................... | G06Q 20/36 |
| | | | | 705/41 |
| 2015/0012444 | A1* | 1/2015 | Brown .................... | H04L 63/08 |
| | | | | 705/76 |

(Continued)

FOREIGN PATENT DOCUMENTS

| | | |
|---|---|---|
| KR | 10-1609046 B1 | 3/2016 |
| KR | 10-2019-0051522 A | 5/2019 |

*Primary Examiner* — Saba Dagnew
(74) *Attorney, Agent, or Firm* — Millen, White, Zelano & Branigan, PC; Ryan Pool

(57) ABSTRACT

Provided is a payment method using a one-time payment security code based on a color pixel code. In the payment method, arbitrary color pixel codes are first disposed on a color grid image screen that is formed with color pixels of various colors in a smartphone-dedicated application, a user inputs a user pattern to select color pixels, a one-time payment security code is generated by combining the color pixel codes and the user pattern, and the one-time payment security code is utilized as information for paying for the user's purchase of a product or a service.

5 Claims, 24 Drawing Sheets

(56) References Cited

U.S. PATENT DOCUMENTS

2015/0213257 A1* 7/2015 Lai .................. H04L 63/083
  726/6
2017/0078278 A1* 3/2017 Hong ................ H04W 12/068

* cited by examiner

PAYMENT METHOD USING ONE-TIME PAYMENT SECURITY CODE BASED ON COLOR PIXEL CODE

CROSS REFERENCE TO RELATED APPLICATION

The present application claims priority to Korean Patent Application No. 10-2020-0050692, filed Apr. 27, 2020, the entire contents of which is incorporated herein for all purposes by this reference.

BACKGROUND OF THE INVENTION

Field of the Invention

The present invention relates to a payment method using a one-time payment security code generated from color pixel codes. More particularly, the present invention relates to a payment method using a one-time payment security code generated from color pixel codes, the payment method including: a first step in which arbitrary color pixel codes are disposed on a color grid image that is formed with color pixels of various colors in a smartphone-dedicated application; a second step in which a user inputs a user pattern to select color pixels in the color grid image; and a third step in which a one-time payment security code generated by combining the color pixel codes and the user pattern is utilized as information for paying for the user's purchase of a product or a service.

Description of the Related Art

As of 2019, about 2.8 billion credit cards (statistics at the web site https://shiftprocessing.com) are issued throughout the world. Many credit card users who purchase a product or a service pay using a credit card. However, there are many illegal uses of credit cards. A credit card that is lost or stolen may be illegally used to make a payment. Alternatively, credit card information including a card number, an expiration date, and a security number (i.e., CVV code) is illegally gathered and used to make a payment on an on-line site where a password is not required. As of 2019, the total amount of payments made through the illegal uses of credit cards throughout the world amounted to about 33 trillion South Korea Won (estimated by the Bank of Korea). Accordingly, in order to prevent the illegal uses of credit cards, in credit card transactions, the trend has been toward the use of EMV that is originally stood for Europay, Mastercard, and Visa and which is known to refer to a payment method based on a technology standard for smart payment cards and the use of security payment technologies that use a one-time token. The technology in the related art, developed for solving problems such as the illegal uses of credit cards, has been disclosed in Korean Patent No. 10-1609046 (issued on Mar. 29, 2016) titled "SYSTEM FOR PREVENTING ILLEGAL USE OF CREDIT CARD BY IDENTIFYING NEAR USER". The technology is required to prove that a physical credit card and a smartphone of an owner of the physical credit card are present in the same place. This provides the advantage that security is enhanced. However, the technology in the related art does not ensure the security in an on-line payment using a credit card. In a case where a credit card is used for an off-line payment, credit card information is disclosed to other persons, and the illegal use of the credit card information by other persons for payment cannot be prevented.

On the other hand, in a case where a QR code or a bar code is used as payment information, everyone who owns only an image of the payment information can illegally use the payment information. The technology in the related art, developed to solve the problem in terms of the security of the payment information, has been disclosed in Korean Patent Application Publication No. 10-2019-0051522 (published on May 15, 2019) tilted "METHOD AND ELECTRONIC DEVICE FOR GENERATING QR CODE". The method includes calling a QR code formed with multiple position identification symbols that are to be associated by an electronic apparatus with data and a data area, enabling the electronic apparatus to divide the data area into multiple blocks and to change an arrangement of the multiple blocks, and enabling the electronic apparatus to encode and store the data area in which the changing of the arrangement is completed. With the method, the arrangement of the blocks resulting from the division, a new QR code is distributed, and it is possible to read the QR code through a dedicated application. This provides the advantage that the security of the QR code is improved. However, in the technology in the related art, a separate dedicated application is necessary to read a QR code in which an arrangement of blocks is changed. This causes a user an inconvenience when using the QR code. The blocks of which an arrangement is changed may be photographed or image-captured, and the blocks may be restored to its original state using a hacking program or the like. Thus, there occurs a security problem in that illegal use is possible.

Examples of the related art include Korea Patent No. 10-1609046 (issued on Mar. 29, 2016) titled "SYSTEM FOR PREVENTING ILLEGAL USE OF CREDIT CARD BY IDENTIFYING USER WHO IS LOCATED NEARBY", and Korean Unexamined Patent Application Publication No. 10-2019-0051522 (issued on May 15, 2019) tilted "METHOD AND ELECTRONIC DEVICE FOR GENERATING QR CODE".

SUMMARY OF THE INVENTION

An objective of the present invention is to provide a payment method using a one-time payment security code based on a color pixel code. The payment method is designed to enhance the security of a credit card. In a case where a payment is made using a credit card, credit card information is not disclosed to other persons. Even if a generated payment security code is stolen, a one-time payment security code is generated to prevent the stolen payment security code from being used for payment. A supplier is prevented from arbitrarily making charges on the credit card. A limitation is imposed on an amount to be paid with a credit card that is a target for stealing, and thus illegal use of the credit card is discouraged. In the payment process, a process of generating a one-time payment security code based on a color pixel code, which was not employed in the past is performed, a scheme for dynamic displaying a payment security code is employed, and a key chain payment-dedicated card is used.

According to an aspect of the present invention, there is provided a payment method using a one-time payment security code based on a color pixel code, the payment method including: displaying a color grid image resulting from combining color pixels, in a dedicated application; determining arbitrarily a color pixel code corresponding to each color pixel of the color grid image, in the dedicated application; enabling a user to input a user pattern into the dedicated application to select color pixels of the color grid image displayed in the dedicated application; a one-time payment security code by collecting the respective color pixel codes of the color pixels corresponding to the user pattern in the dedicated application and generating.

According to another aspect of the present invention, there is provided a payment method using a one-time payment security code based on a color pixel code, the payment method including: transmitting a payment approval request from a payment terminal of a supplier to a central server; enabling a key chain payment-dedicated card associated with a user's dedicated application to recognize payment request information of the payment terminal of the supplier; displaying the payment request information of the payment terminal, which is input into the key chain payment-dedicated card, in the dedicated application; displaying a color grid image resulting from combining color pixels, together with the payment request information, in the dedicated application; determining arbitrarily a color pixel code corresponding to each color pixel of the color grid image, in the dedicated application; enabling a user to input a user pattern into the dedicated application to select color pixels of the color grid image displayed in the dedicated application; generating a one-time payment security code by collecting the respective color pixel codes of the color pixels corresponding to the user pattern, in the dedicated application; transmitting payment request information, which includes the one-time payment security code and an amount to be paid, from the dedicated application to the central server; and making a payment by enabling the central server to compare the payment request information received from the dedicated application and the payment request information received from the payment terminal and to approve the payment approval request transmitted from the payment terminal to the central server, when the two pieces of payment request information are the same and validity of the one-time payment security code is recognized.

According to still another aspect of the present invention, there is provided a payment method using a one-time payment security code based on a color pixel code, the payment method including: inputting an amount to be paid by a user into a dedicated application; displaying a color grid image resulting from combining color pixels, in a dedicated application; determining arbitrarily a color pixel code corresponding to each color pixel of the color grid image, in the dedicated application; enabling a user to input a user pattern into the dedicated application to select color pixels of the color grid image displayed in the dedicated application; generating a one-time payment security code that is limitedly usable for the amount to be paid, which is input by collecting the respective color pixel codes of the color pixels corresponding to the user pattern in the dedicated application; transmitting the one-time payment security code from the dedicated application to a central server; transmitting a payment approval request from a payment terminal of a supplier to the central server; transferring the one-time payment security code from the dedicated application to the payment terminal of the supplier; transmitting the one-time payment security code from the payment terminal to the central server; and making a payment by enabling the central server to compare the one-time payment security code received from the dedicated application and the one-time payment security code received from the payment terminal and to approve the payment approval request transferred from the payment terminal to the central server, when the two one-time payment security codes are the same.

According to still another aspect of the present invention, there is provided a payment method using a one-time payment security code based on a color pixel code, the payment method including: generating one-time payment security code in a dedicated application; displaying the one-time payment security code as payment information; dividing the payment information into multiple blocks; changing continuously an arrangement of payment information blocks resulting from the division; arranging temporarily the payment information blocks resulting from the division, in a normal manner; enabling a reader of a supplier to recognize payment information in which blocks are temporarily arranged in a normal manner; and making a payment using the payment information recognized by the reader.

A payment method using a one-time payment security code based on a color cell code, according to the present invention, provides the following advantages. Firstly, a payment can be made without credit card information being disclosed to other persons. Secondly, a one-time payment security code is generated each time a payment is made. Thus, even if the payment security code is stolen by another person, the stolen payment security code cannot be used for payment. Thirdly, a user can directly input and designate an amount of payment. Thus, an error in a supplier inputting the amount of payment can be prevented. At the same time, even if other persons steal or hack the payment security code, they cannot obtain great monetary benefit from such an illegal act. This discourages such illegal acts. Fourthly, even if a user inputs the same pattern into a color grid image, the respective color pixel codes of color pixels that are arranged in the color grid image are arbitrarily arranged. Thus, a one-time payment security code based on a color pixel code that differs each time is generated, thereby enhancing the security. Fifthly, a function is utilized in which a position of a payment information image, such as a QR code or a bar code that is formed as a one-time payment security code based on a color pixel code, is continuously moved. Thus, other persons can be prevented from illegally photographing or image-capturing the payment information by using a camera or performing a hacking. Sixthly, a payment-dedicated card that is associated with a user's mobile device by employing a key chain scheme is utilized. Thus, a payment is possibly made without the mobile device being handed over to other persons, and only a one-time payment security code is provided to a supplier. This provides the advantage that security is enhanced.

BRIEF DESCRIPTION OF THE DRAWINGS

FIGS. 7 and 8 are flowcharts for a key pay type of the payment method using a one-time payment security code based on a color pixel code according to the embodiment of the present invention;

DETAILED DESCRIPTION OF THE INVENTION

In order to get a full understanding of the present invention, operational advantages thereof, and the objective thereof to which the following claims are directed, reference should be made to the accompanying drawings in which preferable embodiments of the present invention are illustrated.

The preferable embodiments of the present invention will be described in detail below with reference to the accompanying drawings.

As illustrated in FIGS. 1 to 4, there are three types of payment methods using a one-time payment security code based on a color pixel code according to a first embodiment of the present invention. For convenient description, these three types are referred to as a key pay type, a color pay type, and a light pay type, respectively. A step of generating the one-time payment security code based on the color pixel code, which is applied in a manner that is common to the key pay type, the color pay type, and the light pay type, includes: a step of displaying a color grid image resulting from combining color pixels, in a dedicated application; a step of arbitrarily determining a color pixel code corresponding to each color pixel of the color grid image, in the dedicated image; a step of enabling a user to select color pixels of the color grid image displayed in the dedicated application and to input a user pattern into the dedicated application; and a step of collecting the respective color pixel codes of color pixels corresponding to the user pattern, in the dedicated application, and generating a one-time payment security code.

Figure 1:
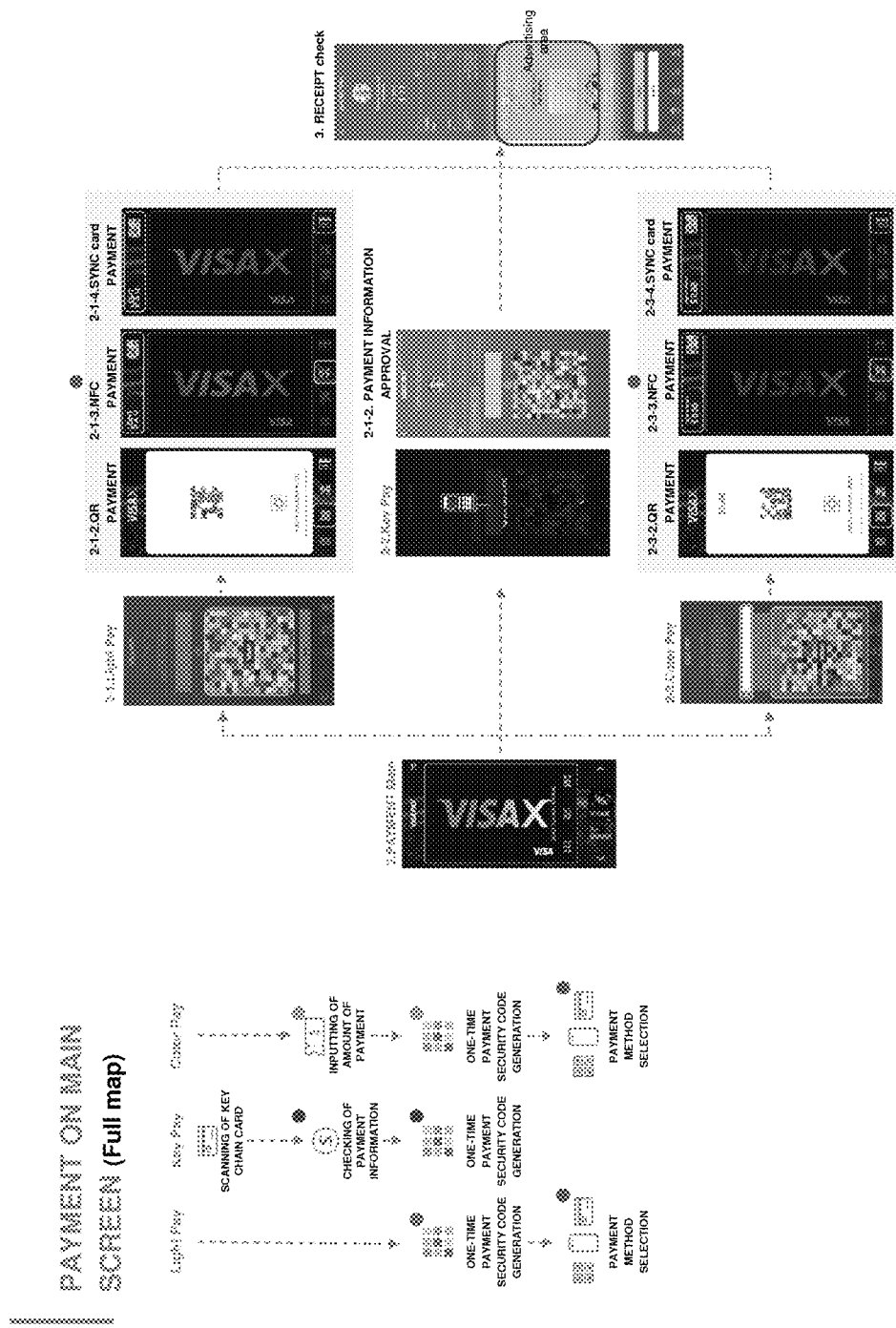
FIG. 1 is a conceptual diagram illustrating a payment method using a one-time payment security code based on a color pixel code according to an embodiment of the present invention.
Figure 2:
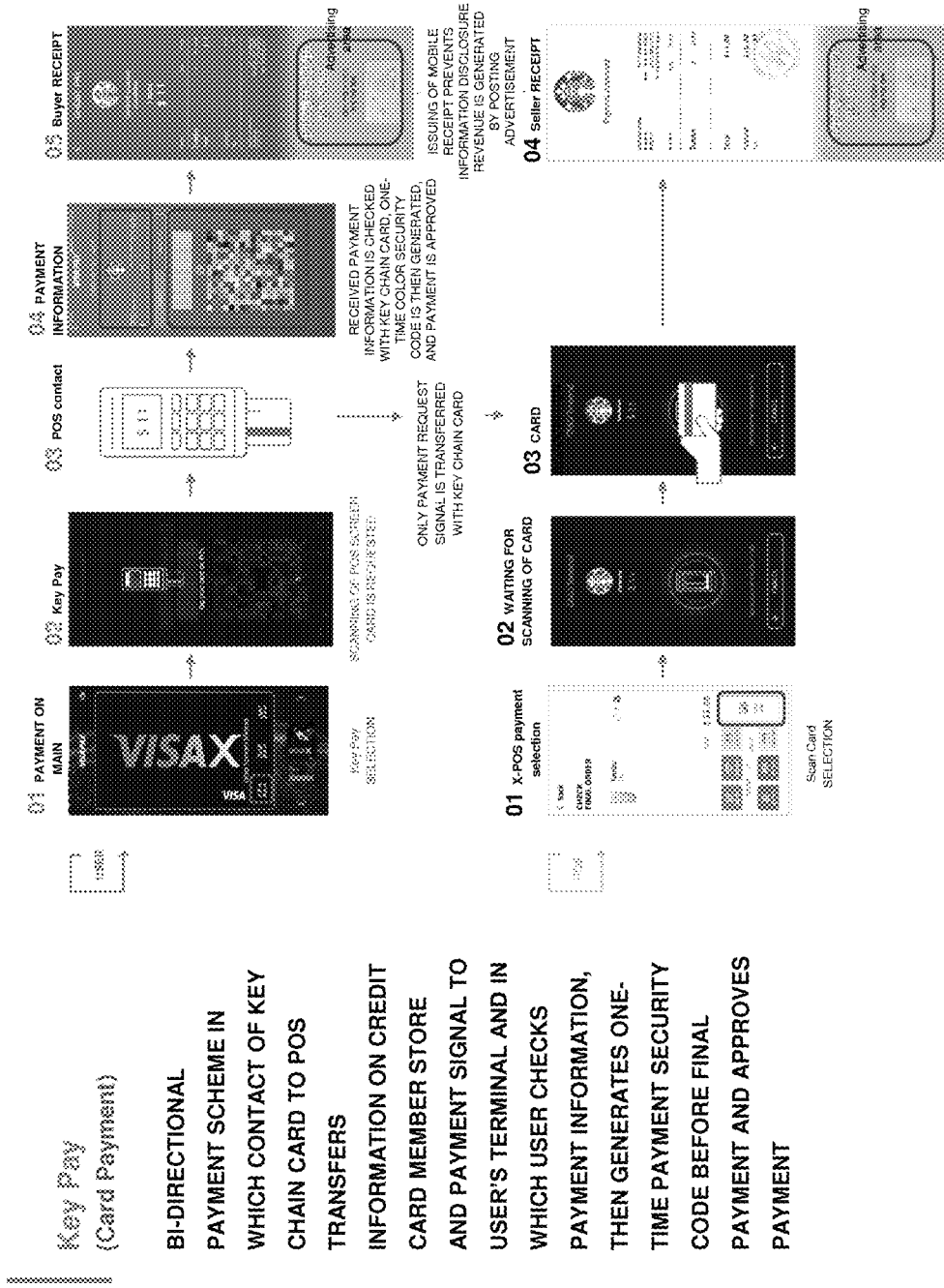
FIG. 2 is a conceptual diagram for performing a key pay type of the payment method using a one-time payment security code based on a color pixel code according to the embodiment of the present invention.

As illustrated in FIGS. 1 and 2, the key-pay-type payment method according to the first embodiment of the present invention includes: a step of transmitting a payment approval request from a payment terminal of a supplier to a central server; a step of enabling a key chain payment-dedicated card associated with a user's dedicated application to recognize payment request information of the payment terminal of the supplier; a step of displaying the payment request information of the payment terminal, which is input into the key chain payment-dedicated card, in the dedicated application; a step of displaying a color grid image resulting from combining color pixels, together with the payment request information, in the dedicated application; a step of arbitrarily determining a color pixel code corresponding to each pixel color of the color grid image, in the dedicated application; a step of enabling a user to select color pixels of the color grid image displayed in the dedicated application and to input a user pattern into the dedicated application; a step of collecting the respective color pixel codes of color pixels corresponding to the user pattern, in the dedicated application, and generating a one-time payment security code; a step of transmitting payment request information, which includes the one-time payment security code and an amount to be paid, from the dedicated application to the central server; and a step of enabling the central server to compare the payment request information received from the dedicated application and the payment request information received from the payment terminal and to approve the payment approval request transmitted from the payment terminal to the central server, when the two pieces of payment request information are the same and validity of the one-time payment security code is recognized, and of making a payment.

Figure 3:
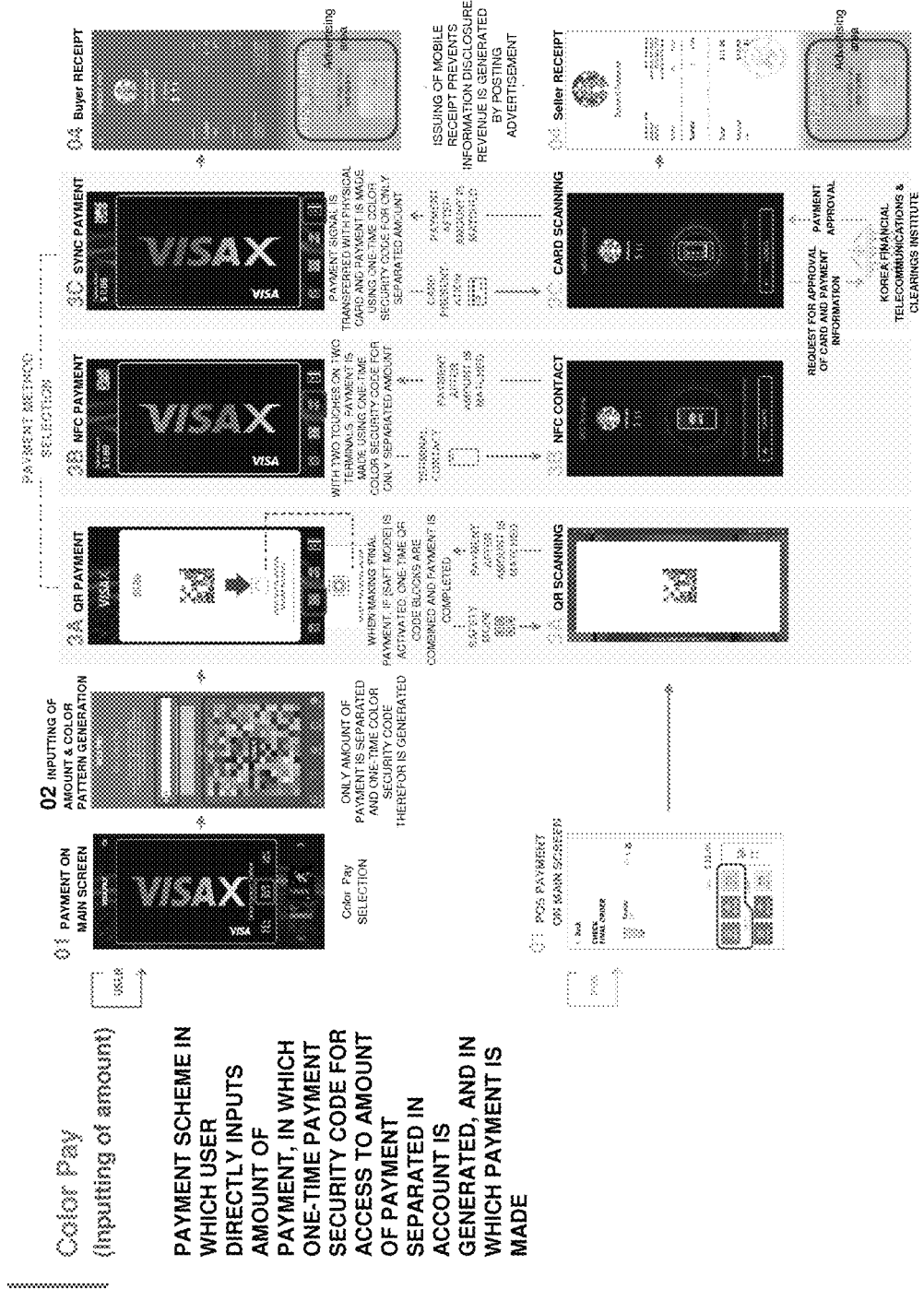
FIG. 3 is a conceptual diagram for performing a color pay type of the payment method using a one-time payment security code based on a color pixel code according to the embodiment of the present invention.

As illustrated in FIGS. 1 and 3, the color-pay-type payment method according to the first embodiment of the present invention includes: a step of enabling a user to input an amount to be paid into a dedicated application; a step of displaying a color grid image resulting from combining color pixels, in the dedicated application; a step of arbitrary determining a color pixel code corresponding to each color pixel of the color grid image, in the dedicated application; a step of enabling a user to select color pixels of the color grid image displayed in the dedicated application, and to input a user pattern into the dedicated application; a step of collecting the respective color pixel codes of color pixels corresponding to the user pattern, in the dedicated application and generating a one-time payment security code that is limitedly usable for the amount to be paid, which is input; a step of transmitting the one-time payment security code from the dedicated application to a central server; a step of transmitting a payment approval request from a payment terminal of a supplier to the central server; a step of transferring the one-time payment security code from the dedicated application to the payment terminal of the supplier; a step of transmitting the one-time payment security code from the payment terminal to the central server; and a step of enabling the central server to compare the one-time payment security code received from the dedicated application and the one-time payment security code received from the payment terminal and to approve the payment approval request transmitted from the payment terminal to the central server, when the two one-time payment security codes are the same, and of making a payment.

The one-time payment security code in the color-pay-type payment method may be transmitted in a state of being displayed as payment information. There are three types of methods of displaying and transmitting the payment information. That is, a dynamic display scheme, a short-distance wireless communication scheme, and a key pay scheme may be utilized.

Figure 5:
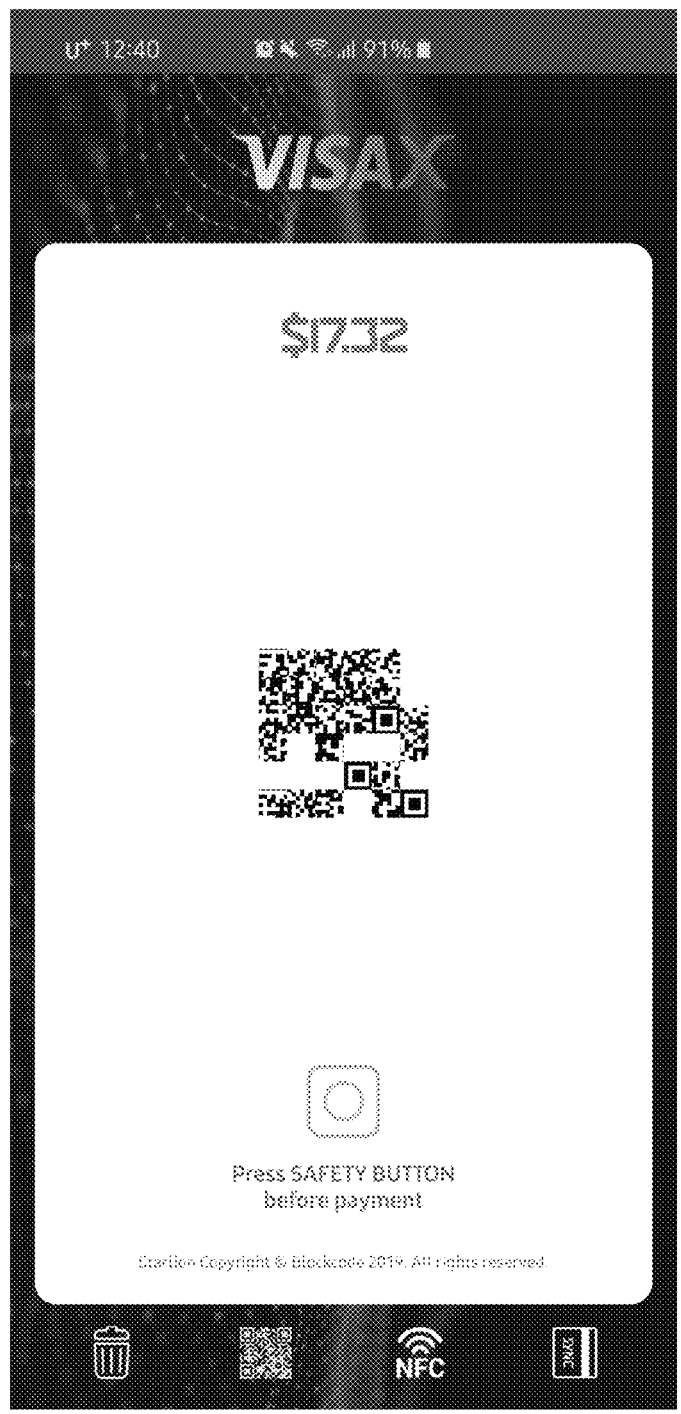
FIGS. 5 to 7 are diagrams for actually a dynamic display scheme in the payment method using a one-time payment security code based on a color pixel code according to the embodiment of the present invention.
Figure 6:

As illustrated in FIGS. 5 to 6, a payment method that deploys the dynamic display scheme for displaying the payment information includes: a step of generating a one-time payment security code in a dedicated application; a step of displaying the one-time payment security code as payment information; a step of dividing the payment information into multiple blocks; a step of continuously changing an arrangement of payment information blocks resulting from the division; a step of temporarily arranging the payment information blocks resulting from the division, in a normal manner; a step of enabling a reader of a supplier to recognize payment information in which blocks are temporarily arranged in a normal manner; and a step of making a payment with the payment information recognized by the reader. With the above-described dynamic display method, the payment information in the color-pay-type payment method can be transmitted to the payment terminal.

The dynamic display scheme is described in more detail as follows. Regarding the step of dividing the generated payment information into multiple blocks, after the payment information is generated, when a button (which corresponds to "SAFETY BUTTON" displayed on the respective lower center portions of FIG. 5) is separately pushed down on immediately before making a payment, or when a button formed to serve as both an input button for finishing inputting a password and a dynamic display button for the payment information is pushed down on, the step of dividing the generated payment information into multiple blocks is performed as soon as the button is pushed down on. The dictionary definition of the "block" is a piece of wood, stone, or concrete with straight sides. However, according to the present invention, the block does not necessarily have a specific shape or size. In the present specification, it is assumed that the entire payment information that retains its shape is divided into two or more pieces. The term "block" here is used to mean a piece that results from the division of the payment information.

In the step of continuously changing an arrangement of payment information blocks resulting from the division, there are various ways of continuously changing the arrangement of the payment information resulting from the division. For example, in the same manner as puzzle pieces can be assembled to form a picture, when an empty space occurs, a block adjacent thereto may occupy the empty space, a next block adjacent thereto may occupy an occurring empty space, and so on. Blocks randomly may move in the respective positions, respectively, of other blocks at the same time. All blocks may move by one space in the same direction or may move in a manner that forms a circle. At this point, in the step of changing an arrangement of payment information blocks, it is important that the payment information in a normal shape should not be seen by a naked eye or should not be recognized, photographed, or image-captured, using a camera, illegal software, or the like. This prevents the illegal use thereof.

The step of temporarily arranging in a normal manner the payment information blocks resulting from the division may be repeatedly performed with a fixed periodicity. In this case, a speed for defining a time interval from when the arrangement of the payment information blocks are changed to when the arrangement thereof is temporarily changed in a normal manner may be set in such a manner that the speed falls within a recognition speed range of a reader. For example, when it is assumed that a recognition speed at which the reader scans the payment information falls within a range from 100 to 500 times per second, a speed at which the arrangement of the payment information blocks is changed may be set to fall within a range from 30 to 60 times per second. Thus, the payment information blocks may be arranged in a normal manner during a continuance duration of 0.017 ($\approx 1/60$) to 0.333 ($\approx 1/30$) seconds. A step in which the payment information in which blocks are arranged in a normal manner is performed during the continuance duration of the payment information in which the blocks are arranged in a normal manner. The continuance duration is so short that with the naked eye, it is difficult to clearly recognize the payment information in which blocks are arranged in a normal manner. This provides the advantage that the payment information is impossible to illegally photograph or image-capture with a camera or with a smartphone for the illegal use thereof.

In a case where the short-distance wireless communication scheme is applied for transmission of the payment information, in the color-pay-type payment method, a scheme for transferring the one-time payment security code to the payment terminal of the supplier may be a scheme for non-contact, such as a near field communication (NFC).

In a case where the key pay scheme is applied for the transmission of the payment information, a step of transmitting a one-time payment security code to a key chain payment-dedicated card that is associated with a user's dedicated application, in a dedicated application, and a step of enabling a payment terminal to recognize the key chain payment-dedicated card and transmitting the one-time payment security code from the key chain payment-dedicated card to the payment terminal are included.

Figure 7:
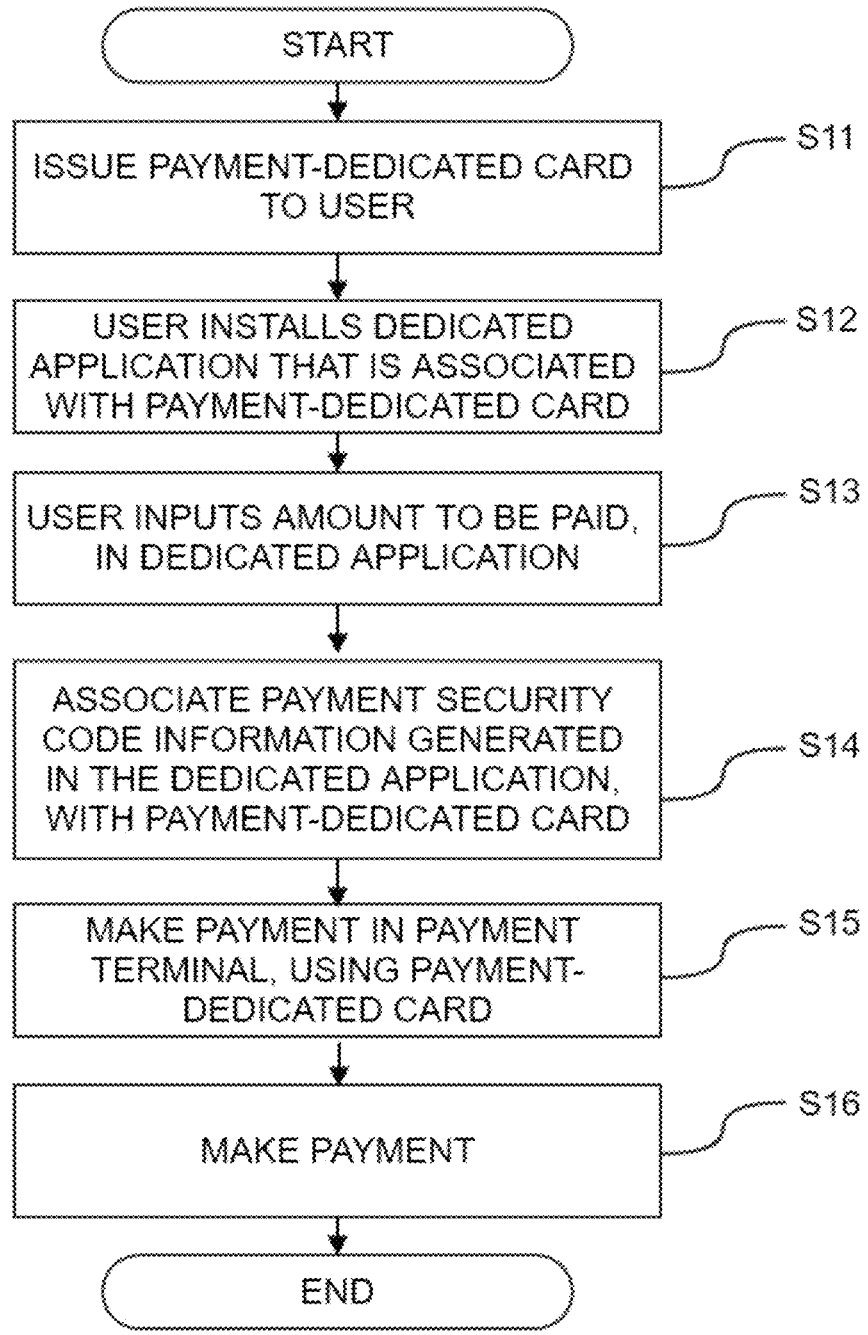

More specifically, as illustrated in FIG. 7, the key-pay-type payment method is a method that is used not to directly hand over a smartphone or a credit card to one other person when making a payment. This method, to which a scheme for inputting an amount to be paid by a user in such a manner that an amount that is input in a user's dedicated application or a payment terminal of a supplier is paid in the payment terminal of the supplier, is applied, includes: a step S11 of issuing a payment-dedicated card, which is a key chain card with which payment security code information that is generated for payment approval in the user's dedicated application is associated; a step S12 of installing a dedicated application that is associated with the payment-dedicated card, in a mobile electronic device, such as a user's smartphone; a step S13 of inputting the amount to be paid by the user, in the dedicated application; a step S14 of generating a payment security code in the user's dedicated application and associating the payment security code information with the payment-dedicated card; a step S15 of enabling a user to attempt to make a payment using the payment-dedicated card, in the payment terminal, and a step S16 of making a payment.

Figure 8:
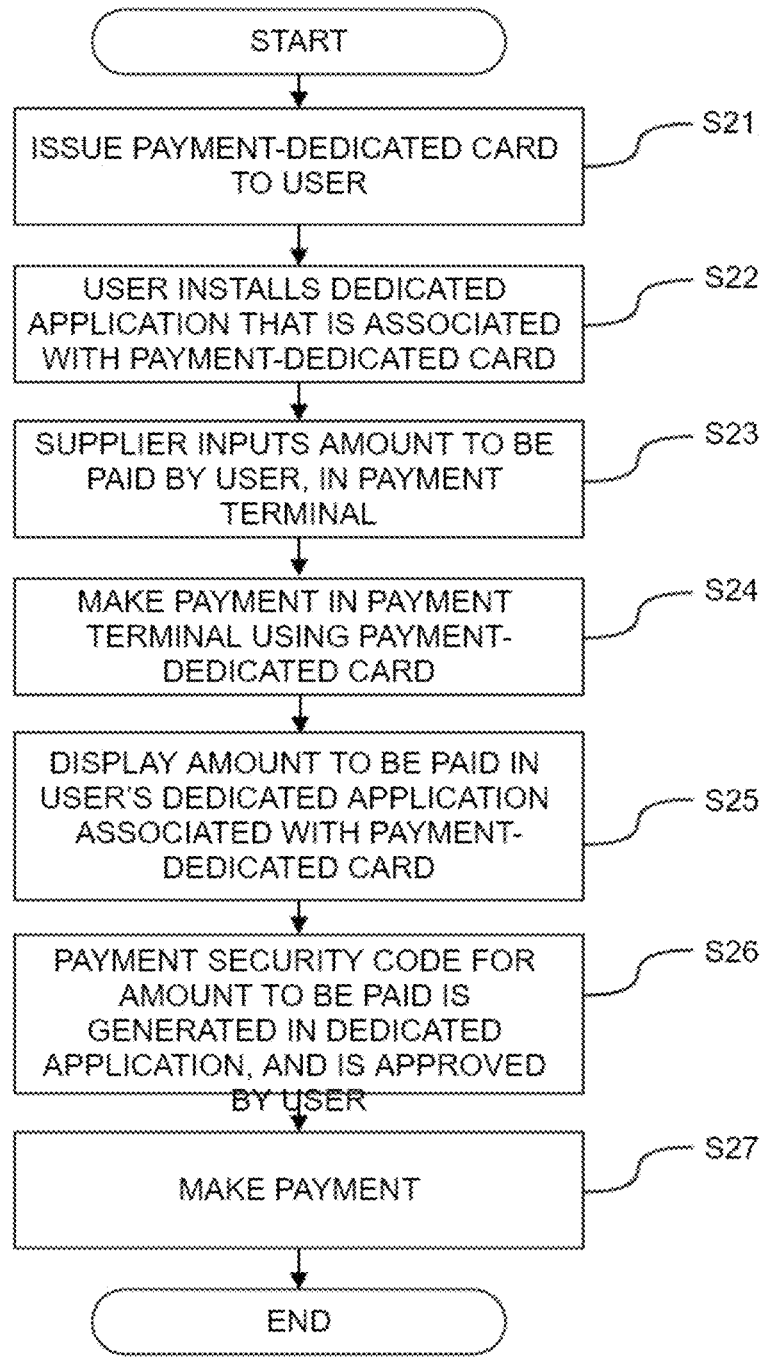

Alternatively, as a modified method, as illustrated in FIG. 8, a method, to which a scheme in which only a supplier inputs an amount to be paid is applied, includes: a step S21 of issuing to a user a payment-dedicated card, which is a key chain card with which payment security code information that is generated for a payment approval in a user's dedicated application is associated; a step S22 of installing a dedicated application that is associated with the payment-dedicated card, in a mobile electronic device, such as a user's smartphone; a step S23 of enabling a supplier to input an amount to be paid by the user, in a payment terminal; a step S24 of enabling the user to attempt to make a payment in the payment terminal using the payment-dedicated card; a step S25 of associating the payment-dedicated card and the dedicated application and displaying the amount to be paid in the user's dedicated application; a step S26 of generating a payment security code for the amount to be paid in the dedicated application and enabling the user to approve a payment in the dedicated application; and a step S27 of making a payment.

The key chain scheme is a scheme for synchronizing data among multiple devices and serves to associate the payment-dedicated card and the mobile electronic device, such as a user's smartphone, and to perform synchronization therebetween. The key chain is a defined set of pieces of data and includes a password, a private key, a certificate, and a secure note. In the method that is used not to directly hand over a smartphone or a credit card to one other person, a payment-dedicated card is issued that functions as the key chain card that is associated with the payment security code information that is generated in the user's dedicated application. The payment-dedicated card performs only an approval-association function in such a manner that an amount that is input or approved in the smartphone is paid in the payment terminal, using a scheme of enabling the payment-dedicated card to be wirelessly connected to the payment terminal, and other schemes.

Figure 4:
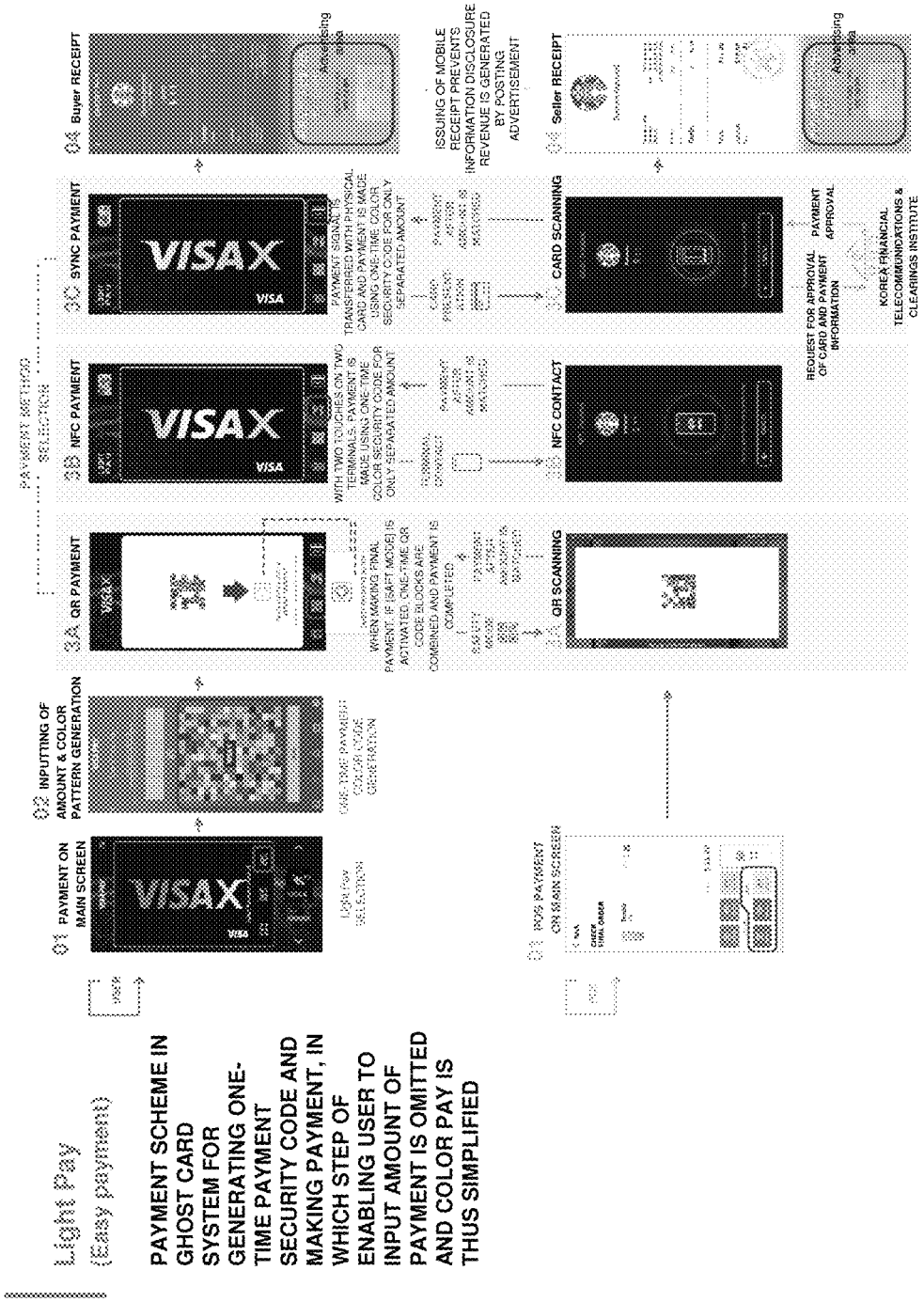
FIG. 4 is a conceptual diagram for performing a light pay type of the payment method using a one-time payment security code based on a color pixel code according to the embodiment of the present invention.

As illustrated in FIGS. 1 and 4, the light-pay-type payment method according to the first embodiment of the present invention includes: a step of displaying a color grid image resulting from color pixels, in a dedicated application; a step of arbitrary determining a color pixel code corresponding to each color pixel of the color grid image, in the dedicated application; a step of enabling a user to select color pixels of the color grid image displayed in the dedicated application and to input a user pattern into the dedicated application; a step of collecting the respective color pixel codes of color pixels corresponding to the user pattern, in the dedicated application and generating a one-time payment security code; a step of transmitting the one-time payment security code from the dedicated application to a central server; a step of enabling a supplier to input an amount to be paid by a user, in a payment terminal and transmitting a payment approval request from the payment terminal of the supplier to the central server; a step of transmitting the one-time payment security code from the dedicated application to the payment terminal of the supplier; a step of transmitting the one-time payment security code from the payment terminal to the central server; and a step of enabling the supplier to compare the one-time payment security code received from the dedicated application and the one-time payment security code received from the payment terminal and to approve the payment approval request transferred from the payment terminal to the central server, when the two one-time payment security codes are the same, and of making a payment.

The step of transferring the one-time payment security code from the dedicated application to the payment terminal of the supplier in the light-pay-type payment method, to which the dynamic display scheme is applied, may include: a step of displaying the one-time payment security code as payment information; a step of dividing the payment information as multiple blocks; a step of continuously changing an arrangement of the payment information blocks resulting from the division; a step of temporarily arranging the payment information blocks resulting from the division, in a normal manner; and a step of enabling a reader of a supplier to recognize the payment information in which blocks are temporarily arranged in a normal manner.

A transfer scheme in the step of transferring the one-time payment security code from the dedicated application to the payment terminal of the supplier in the light-pay-type payment method may be a scheme for non-contact, such as a near field communication (NFC).

The step of transferring the one-time payment security code from the dedicated application to the payment terminal of the supplier in the light-pay-type payment method, to which the key pay scheme is applied as a transfer scheme, may include: a step of transmitting the one-time payment security code from the dedicated application to a key chain payment-dedicated card that is associated with a user's dedicated application; and a step of enabling the payment terminal to recognize the key chain payment-dedicated card and transmitting the one-time payment security code from the key chain payment-dedicated card to the payment terminal.

According to the first embodiment of the present invention, in order to further improve user convenience, the user may perform setting in such a manner that the step of enabling a user to select color pixels of the color grid image displayed in the dedicated application and to input a user pattern into the dedicated application is automatically performed. Furthermore, when the automatic inputting of the user pattern is set and the dedicated application runs in the background in a user's terminal, the entire payment step may be performed using a key chain payment-dedicated card that is associated with the dedicated application, without separately operating the user's terminal. The setting for the automatic inputting of the user pattern may be performed in each of the key-pay-type payment method, the color-pay-type payment method, and the light-pay-type payment method.

According to the first embodiment of the present invention, the color grid image may be formed as an image including an advertisement. In this case, the user notices the advertisement while drawing the user pattern with a hand movement or the like. Thus, an advertisement effect occurs. By registering an advertisement of a company or the like within the dedicated application, it is possible that revenue is generated. By allocating a portion of this revenue among the users, it is also possible that participation of many more users is encouraged.

Figure 9:
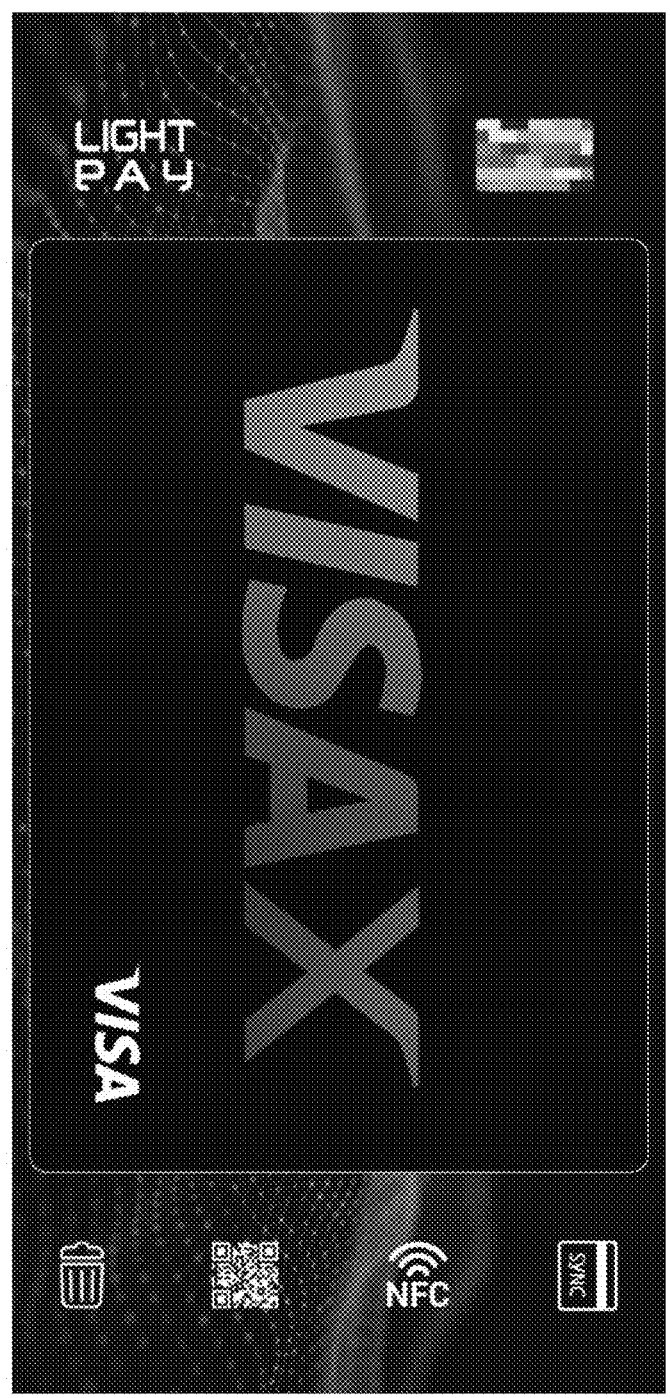
FIGS. 9 and 10 are diagrams for actually performing a process of changing an arrangement of color pixels of each color grid image in the payment method using a one-time payment security code based on a color pixel code according to the embodiment of the present invention.
Figure 10:
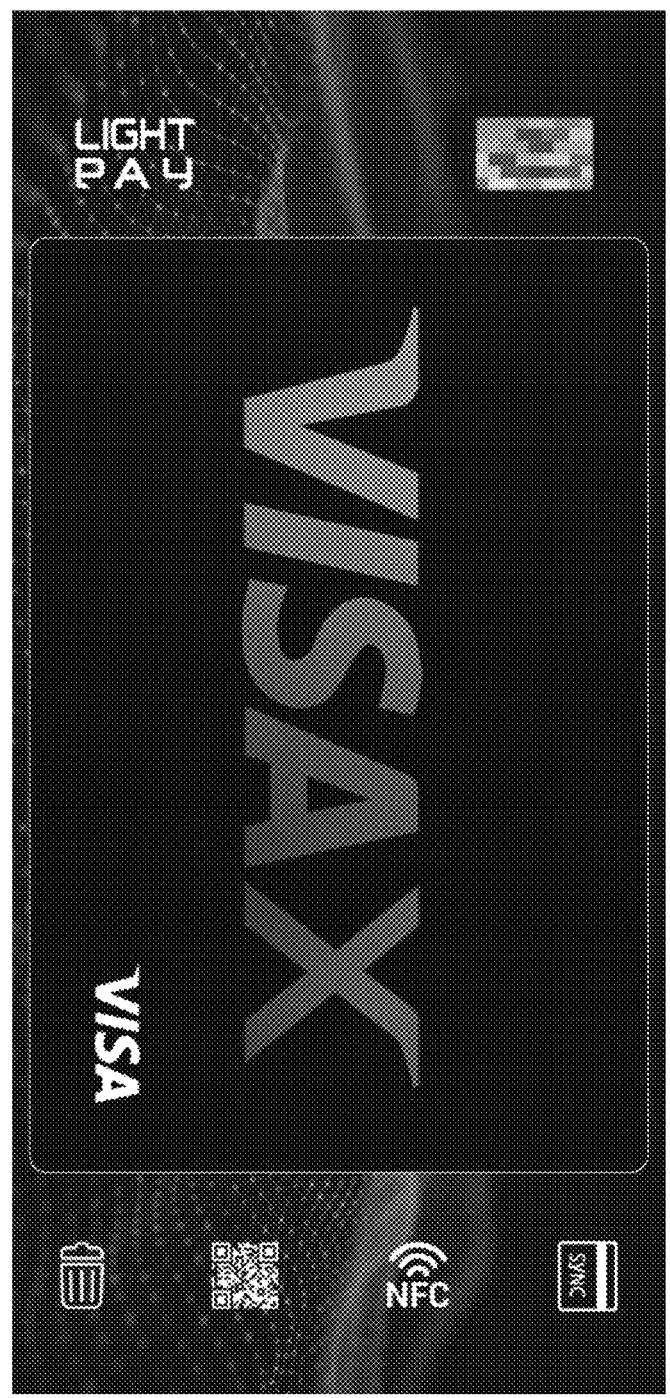

According to the first embodiment of the present invention, as illustrated in the respective upper left portions of FIGS. 9 and 10, an arrangement of color pixels in a color grid image continuously changes. When the user taps the color grid image, the arrangement of color pixels in the color grid image is fixed. This can further enhance the security of the one-time payment security code.

Figure 11:
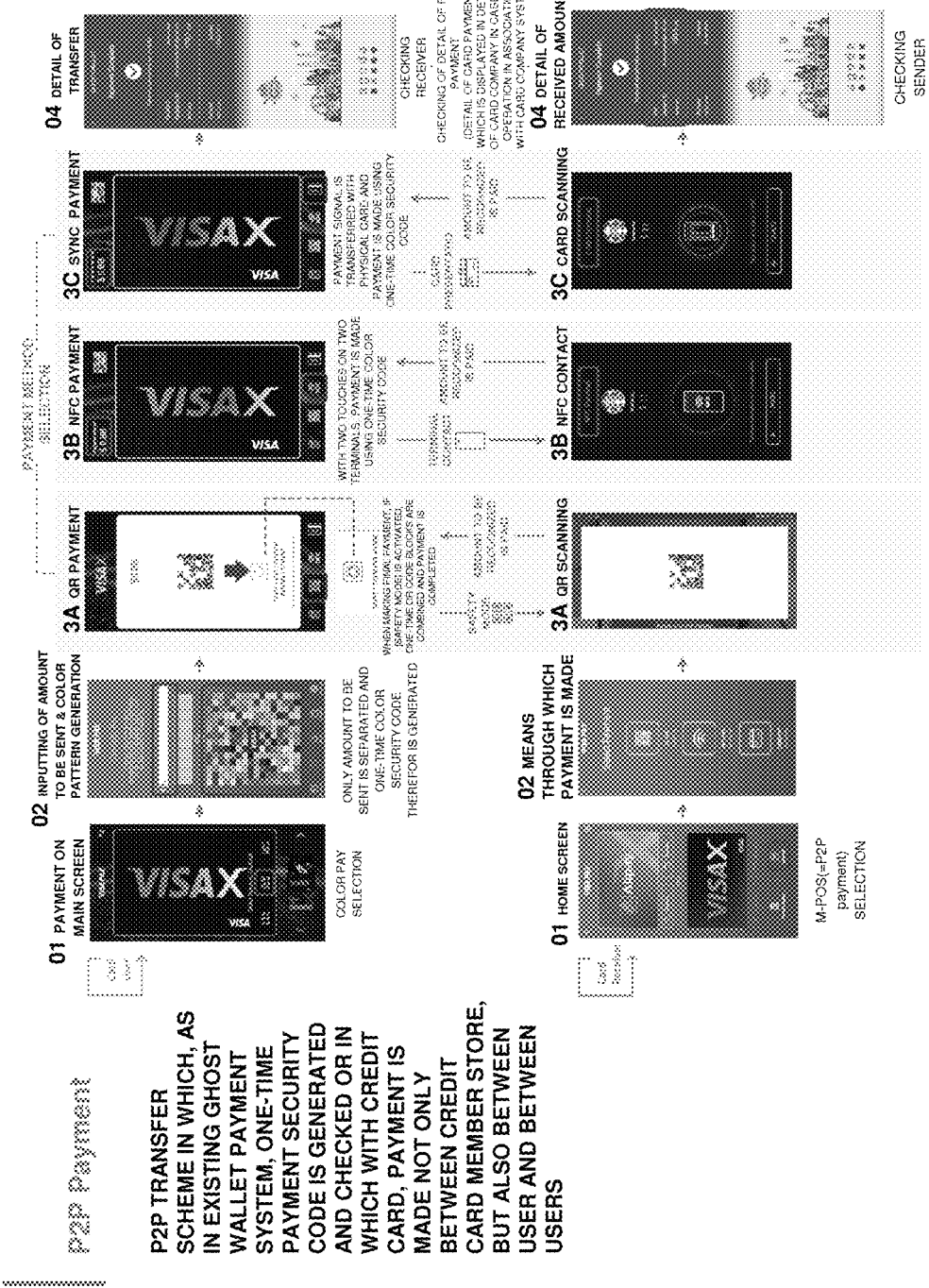
FIG. 11 are conceptual diagrams for performing a payment scheme in which a buyer (or service subscriber) pays for a purchase or subscription to a seller (or service provider) in a person-to-person transaction, in the payment method using a one-time payment security code based on a color pixel code according to the embodiment of the present invention.
Figure 12A:
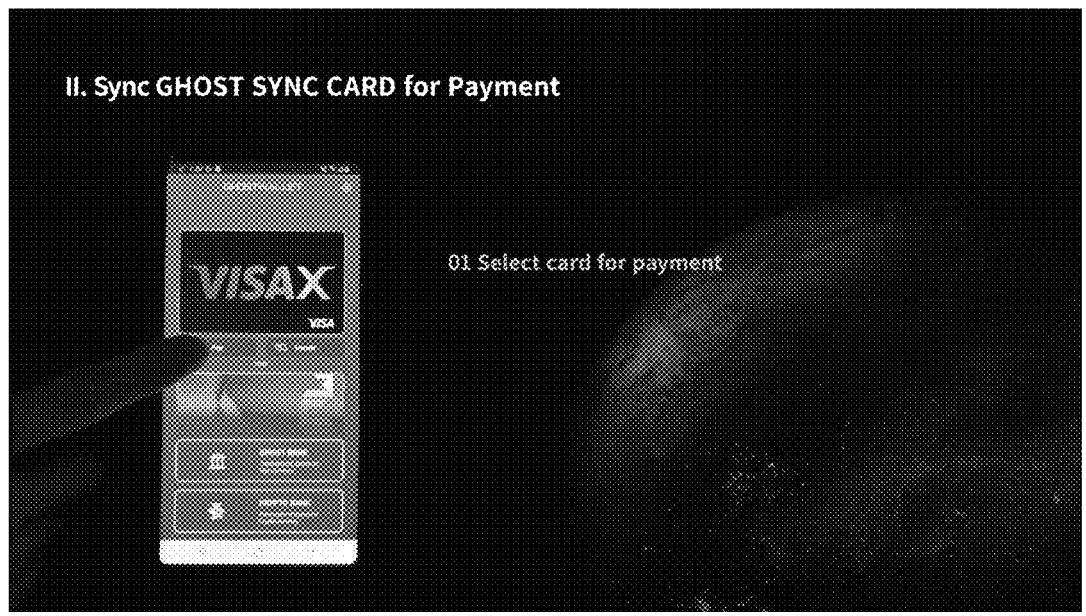
FIGS. 12A to 12M are diagrams for actually demonstrating the key pay type of the payment method using a one-time payment security code based on a color pixel code according to the embodiment of the present invention.
Figure 12B:
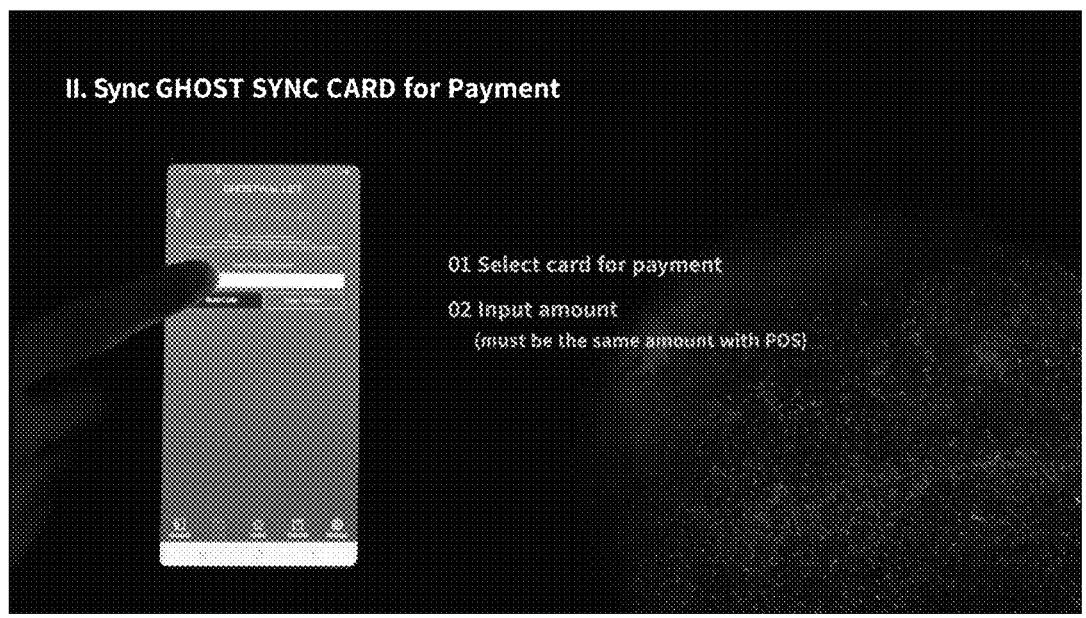
Figure 12C:
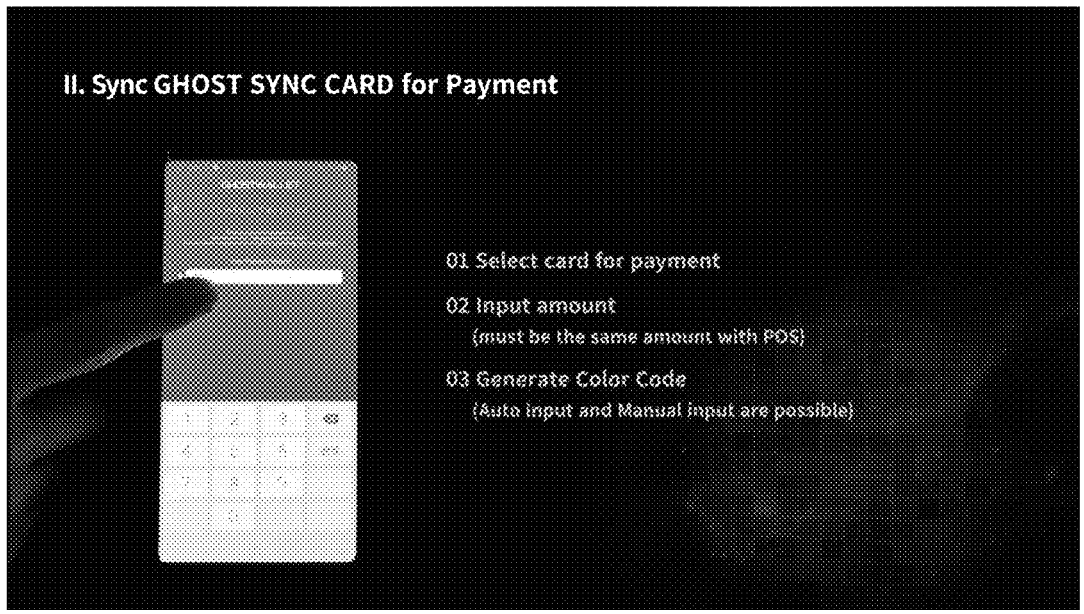
Figure 12D:
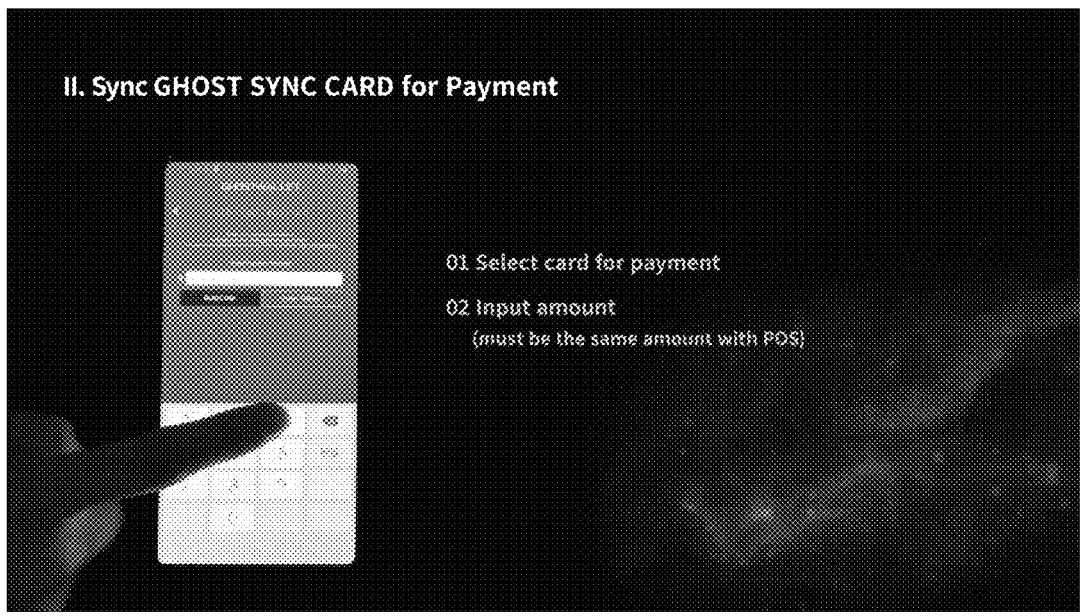
Figure 12E:
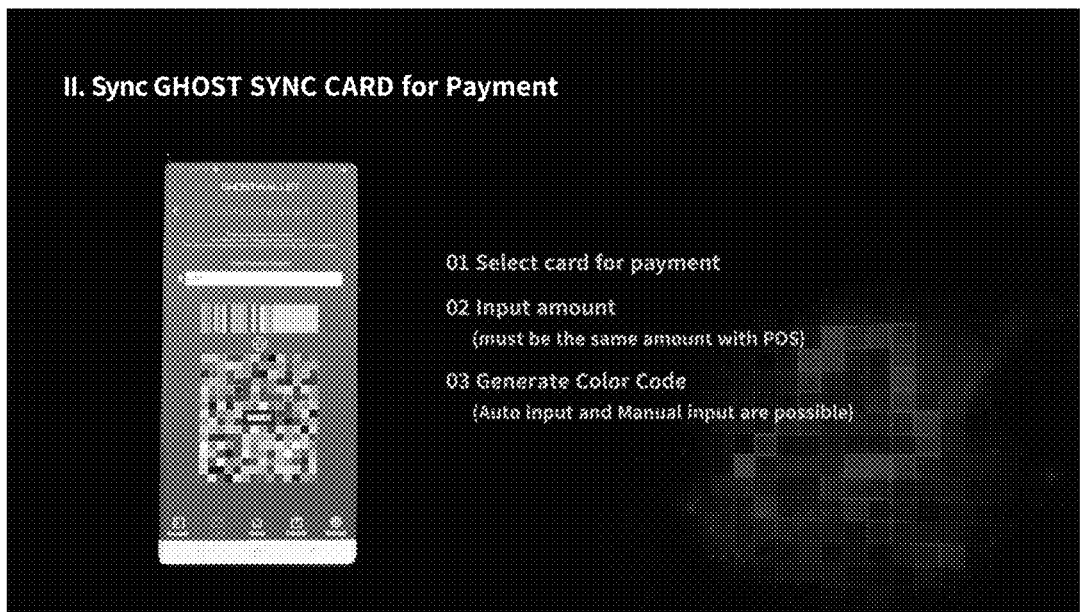
Figure 12F:
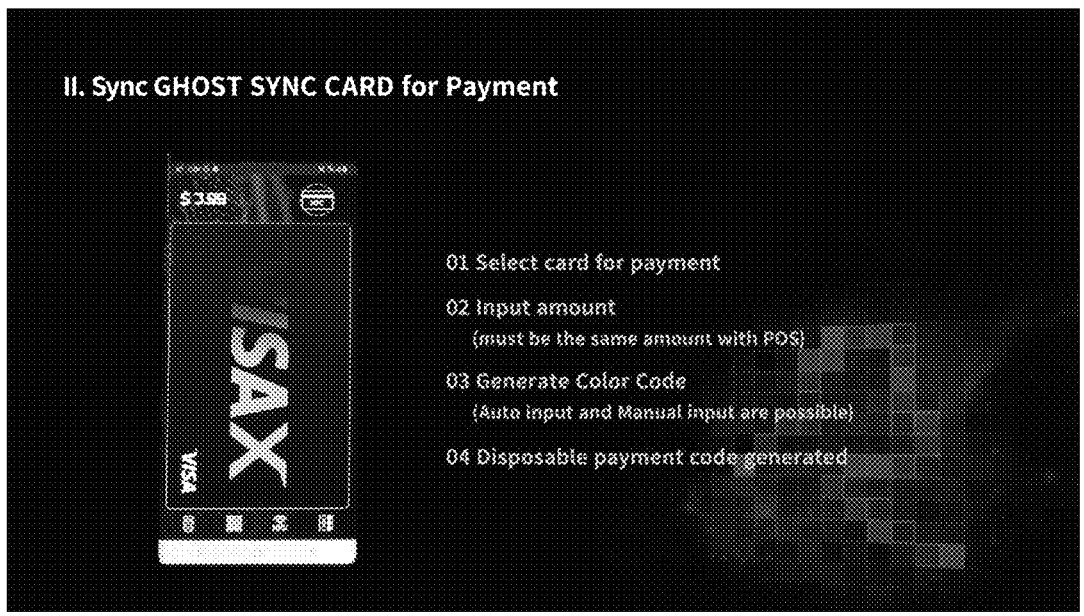
Figure 12G:
Figure 12H:
Figure 12I:
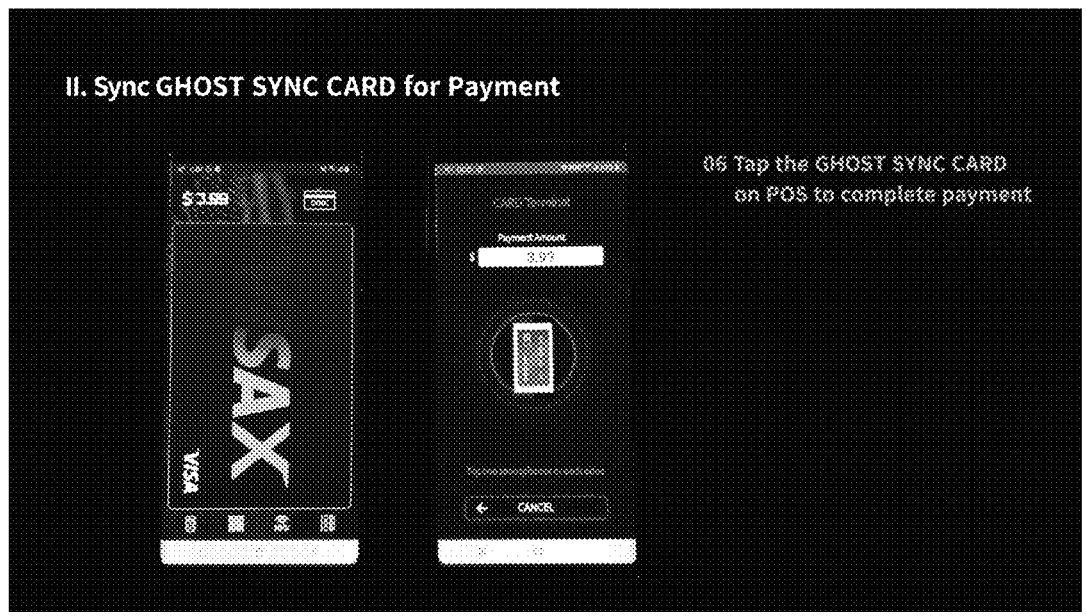
Figure 12J:
Figure 12K:
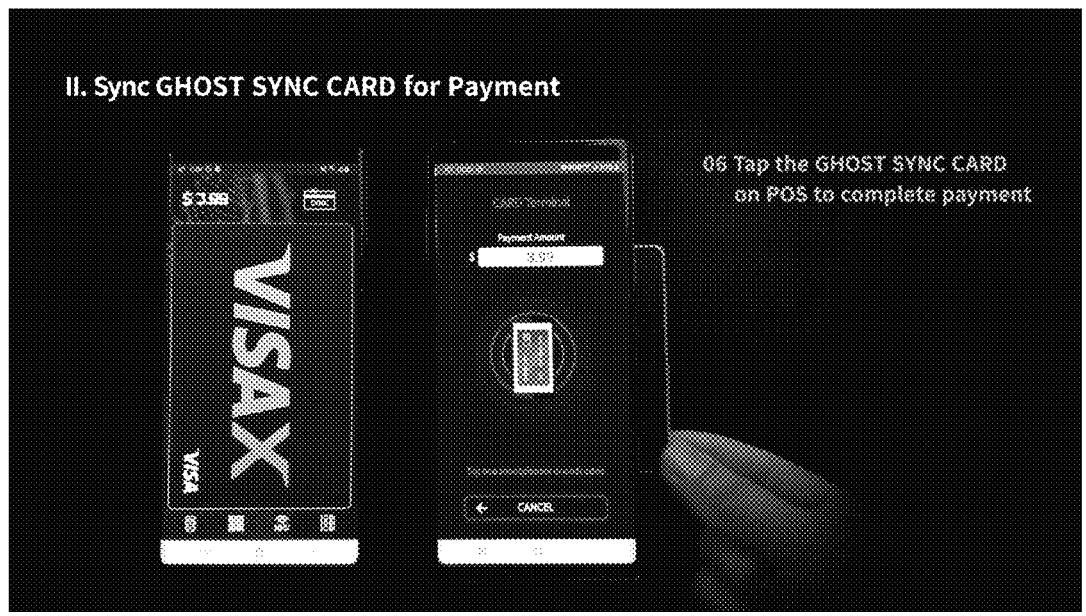
Figure 12L:
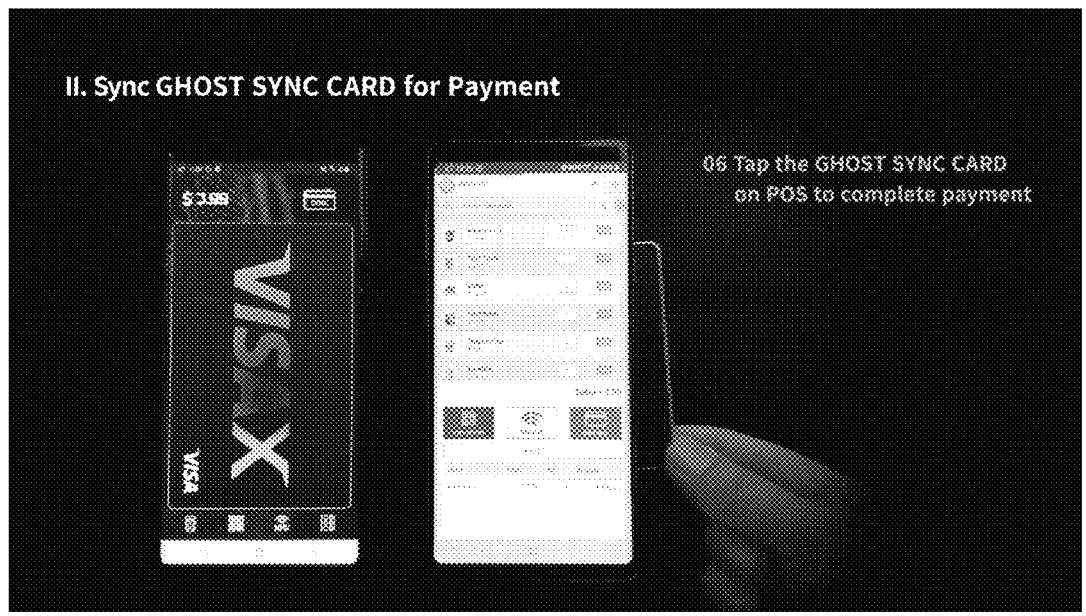
Figure 12M:

A payment method using a one-time payment security code based on a color pixel code according to a second embodiment of the present invention is performed in a case where, as illustrated in FIG. 11, a buyer (or service subscriber) pays for a purchase of a product or service to an seller (or service provider) in a person-to-person transaction, includes: a step of registering a point of sales (POS) in a personal account through which it is possible to make a payment with a credit card, within a seller's (or service provider's) dedicated application and installing the registered POS; a step of inputting an amount to be paid by the buyer (or service subscriber) into a buyer's (or service subscriber's) dedicated application; a step of enabling the buyer (or service subscriber) to generate in the dedicated application a one-time payment security code based on a color pixel code that is limitedly usable for the amount that is input; a step of transmitting the one-time payment security code from the buyer's (or service subscriber's) dedicated application to a central server; a step of enabling the buyer (or service subscriber) to transmit the one-time payment security code based on the color pixel code to the seller's (or service provider's) POS; a step of transmitting a payment approval request and the one-time payment security code from the seller's (or service provider's) POS to the central server; a step of enabling the central server to compare the one-time payment security code received from the buyer's (or service subscriber's) dedicated application and the one-time payment security code received from the seller's (or service provider's) POS and to approve the payment approval request transmitted from the seller's (or service provider's) POS to the central server, when the two one-time payment security codes are the same, and of making a payment.

In addition, according to the present invention, in order to increase the security of the payment security code, although patterns in which a user's hand or the like is brought into contact with the color grid image are the same, payment security codes that have different values are formed each time. To do this, a single payment security code corresponding to each color pixel of a color grid image is arbitrarily formed each time, and an arrangement of color pixels of the color grid image is changed continuously, and thus the color pixels are moved arbitrarily. While this is done, at the moment the user selects an image of the color grid by hand or the like, the arrangement thereof stops changing.

In addition, according to the present invention, there may be provided a method of forming a payment security code in a combined manner. In this method, at the moment a user's hand and or the like is first brought into contact with a color pixel, a single payment security code of the firstly-contacted color pixel is arbitrarily determined. Then, a single payment security code of the secondly-contacted color pixel followed by the firstly-contacted color pixel is arbitrarily determined. Then, the single payment security code of the firstly-contacted color pixel and the single payment security code of the secondly-contacted color pixel are combined and thus a new single payment security code is generated. In this manner, values of payment security codes are formed.

In the key-pay-type payment method according to the first embodiment of the present invention, regarding the way in which the amount to be paid is entered by the user, the order in which payment security codes are formed is illustrated in FIGS. 14A to 14M. Regarding the way in which the amount to be paid is entered by the supplier, the order in which payment security codes are formed is illustrated in FIGS. 13A to 13K.

Figure 13A:
Figure 13B:
Figure 13C:
Figure 13D:
Figure 13E:
Figure 13F:
Figure 13G:
Figure 13H:
Figure 13I:
Figure 13J:
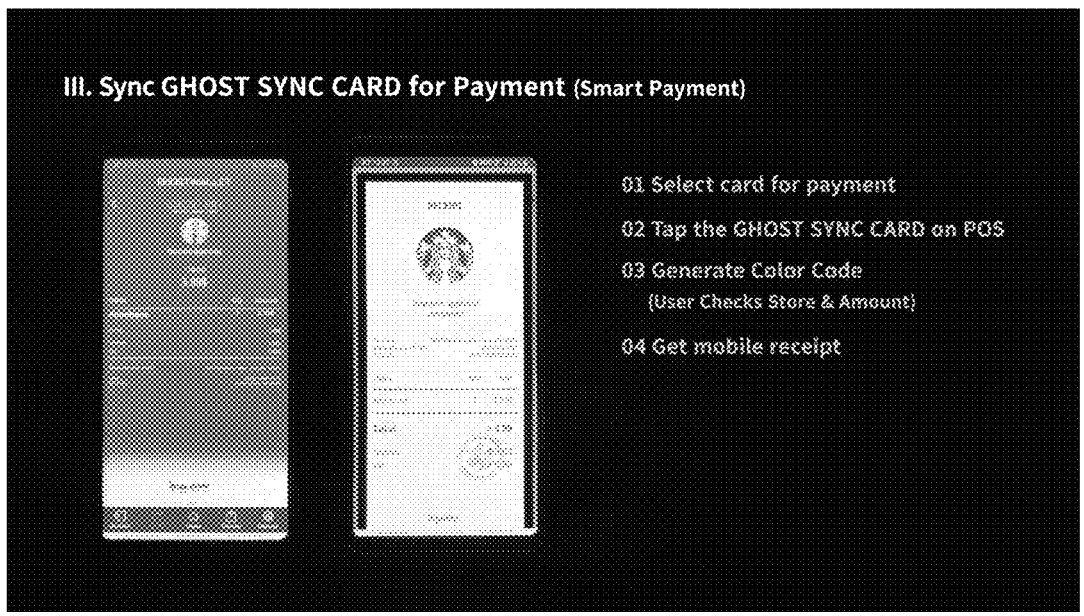
Figure 13K:

With the methods described above, when a payment is made between the supplier (i.e., seller or service provider) and the user (i.e., buyer or service subscriber), as illustrated in FIGS. 13I to 13K, after the payment is completed, a paper-sheet receipt or a web receipt is issued to the supplier, the user, or both. An advertisement that is provided in the dedicated application may be posted on one side of the paper-sheet receipt or the web receipt.

Figure 14:
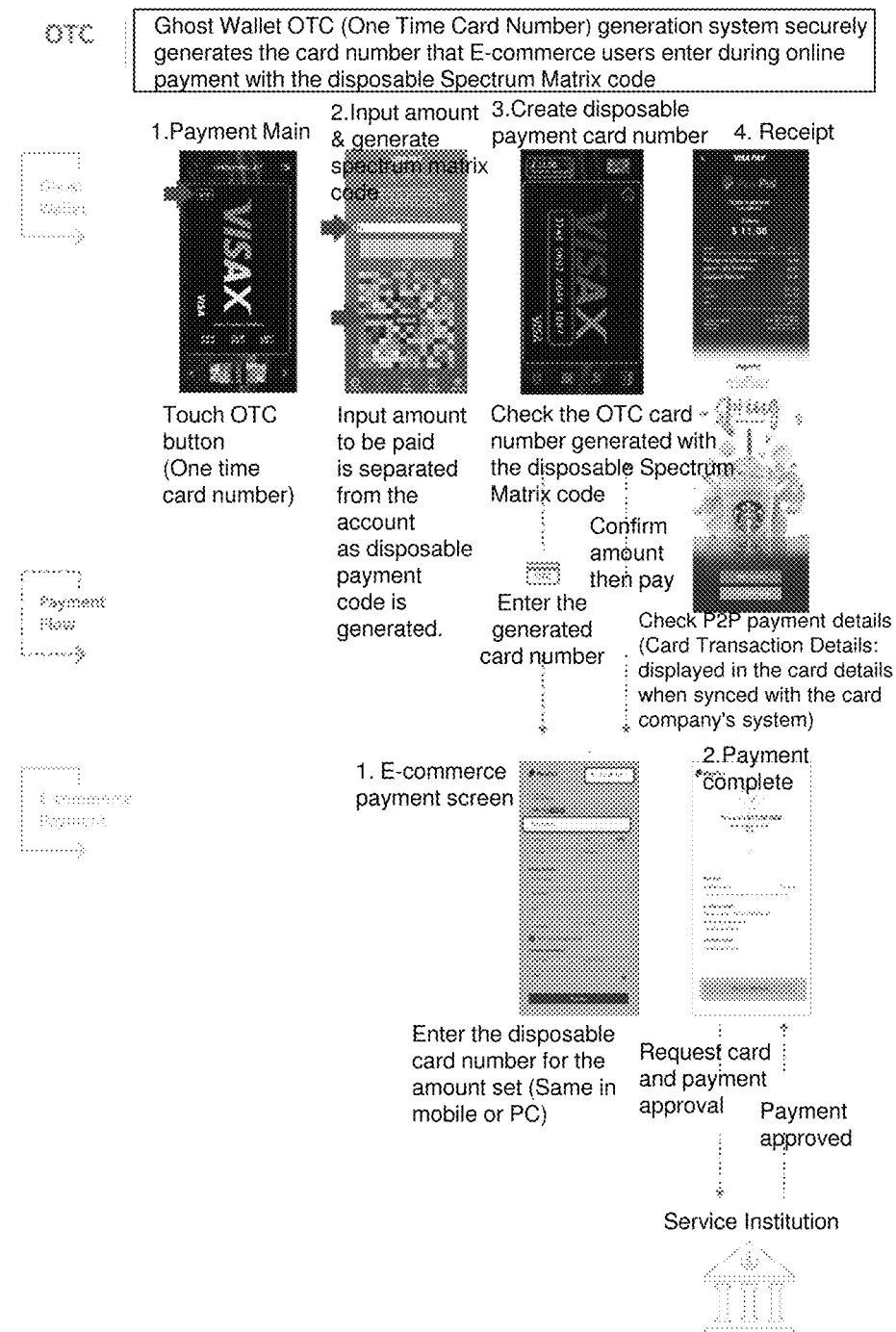
FIG. 14 is a flowchart for an on-line payment method or telephone payment method using a one-time payment security code based on a color pixel code according to an embodiment of the present invention.

According to an embodiment of the present invention, as illustrated in FIG. 14, a one-time card number (OTC) is generated using the one-time payment security code, and an on-line payment or telephone payment is possible with the one-time card number. In addition, it is possible that the user sets an amount of payment in the one-time payment security code when making an on-line payment or telephone payment. A method of doing this includes: a step of enabling a user to select a one-time card number menu from a dedicated application; a step of inputting an amount to be paid; a step of selecting a color pixel code; a step of generating a one-time card number corresponding to a one-time payment security code; and a step of inputting the one-time card number into an on-line payment site and making an on-line payment, or of inputting the one-time card number using an alphanumeric pad or communicating the one-time card number orally with a salesperson for a telephone payment and thus making a telephone payment.

For disclosure, the preferable embodiments are described above with reference to the drawings. Specific terms are used throughout the specification for the purpose of describing the present invention. However, the specific terms are not used to impose any limitation in terms of meaning or to limit the scope of the present invention, which is defined by the claims. From this, it will be understood by a person of ordinary skill in the art that various modifications and other equivalent embodiment are possible. The legitimate technical scope of the present invention should be determined by the technical idea that is defined in the following claims.

What is claimed is:

1. A payment method using a one-time payment security code based on a color pixel code, the payment method comprising:
   displaying a color grid image resulting from combining color pixels, in a dedicated application;
   determining arbitrarily a color pixel code corresponding to each color pixel of the color grid image, in the dedicated application;
   inputting color pixels selected by a user in the color grid image into the dedicated application as a user pattern; and
   collecting the respective color pixel codes of color pixels corresponding to the user pattern in the dedicated application, and generating a one-time payment security code.

2. A payment method using a one-time payment security code based on a color pixel code, the payment method comprising:
   transmitting a payment approval request from a payment terminal of a supplier to a central server;
   enabling a key chain payment-dedicated card associated with a users dedicated application to recognize payment request information of the payment terminal of the supplier;
   displaying the payment request information of the payment terminal, which is input into the key chain payment-dedicated card, in the dedicated application; displaying a color grid image resulting from combining color pixels, together with the payment request information, in the dedicated application;
   determining arbitrarily a color pixel code corresponding to each color pixel of the color grid image, in the dedicated application;
   inputting color pixels selected by a user in the color grid image into the dedicated application as a user pattern;
   collecting the respective color pixel codes of color pixels corresponding to the user pattern, in the dedicated application and generating a one-time payment security code;
   transmitting payment request information, which includes the one-time payment security code and an amount to be paid, from the dedicated application to the central server; and
   enabling the central server to compare the payment request information received from the dedicated application and the payment request information received from the payment terminal and to approve the payment approval request transmitted from the payment terminal to the central server, when the two pieces of payment request information are the same and validity of the one-time payment security code is recognized, and making a payment.

3. A payment method using a one-time payment security code based on a color pixel code, the payment method comprising:
   inputting an amount to be paid set by a user into a dedicated application;

displaying a color grid image resulting from combining color pixels, in a dedicated application;

determining arbitrarily a color pixel code corresponding to each color pixel of the color grid image, in the dedicated application;

inputting color pixels selected by a user in the color grid image into the dedicated application as a user pattern;

collecting the respective color pixel codes of color pixels corresponding to the user pattern in the dedicated application and generating a one-time payment security code that is limitedly usable for the amount to be paid, which is input;

transmitting the one-time payment security code from the dedicated application to a central server;

transmitting a payment approval request from a payment terminal of a supplier to the central server;

transferring the one-time payment security code from the dedicated application to the payment terminal of the supplier;

transmitting the one-time payment security code from the payment terminal to the central server; and enabling the central server to compare the one-time payment security code received from the dedicated application and the one-time payment security code received from the payment terminal and to approve the payment approval request transferred from the payment terminal to the central server, when the two one-time payment security codes are the same, and making a payment, wherein the transferring the one-time payment security code from the dedicated application to the payment terminal of the supplier comprises:

displaying the one-time payment security code as payment information in the dedicated application;

dividing the payment information into multiple blocks in the dedicated application;

changing continuously an arrangement of the payment information blocks resulting from the division, in the dedicated application;

arranging temporarily the payment information blocks resulting from the division, in a normal manner, in the dedicated application; and enabling a reader of the supplier to recognize payment information in which blocks are temporarily arranged in a normal manner.

4. A payment method using a one-time payment security code based on a color pixel code, the payment method comprising:

displaying a color grid image resulting from combining color pixels, in a dedicated application;

determining arbitrarily a color pixel code corresponding to each color pixel of the color grid image, in the dedicated application;

inputting color pixels selected by a user in the color grid image into the dedicated application as a user pattern;

collecting the respective color pixel codes of the color pixels corresponding to the user pattern, in the dedicated application and generating a one-time payment security code;

transmitting the one-time payment security code from the dedicated application to a central server;

inputting an amount to be paid by the user into a payment terminal of a supplier transferring a payment approval request from the payment terminal of the supplier to a central server;

transferring the one-time payment security code from the dedicated application to the payment terminal of the supplier; transmitting the one-time payment security code from the payment terminal to the central server; and enabling the central server to compare the one-time payment security code received from the dedicated application and the one-time payment security code received from the payment terminal and to approve the payment approval request transferred from the payment terminal to the central server, when the two one-time payment security codes are the same, and making a payment, wherein the transferring the one-time payment security code from the dedicated application to the payment terminal of the supplier comprises:

displaying the one-time payment security code as payment information in the dedicated application;

dividing the payment information into multiple blocks in the dedicated application;

changing continuously an arrangement of the payment information blocks resulting from the division, in the dedicated application;

arranging temporarily the payment information blocks resulting from the division, in a normal manner, in the dedicated application; and enabling a reader of the supplier to recognize payment information in which blocks are temporarily arranged in a normal manner.

5. The payment method of claim 1 wherein a position of a payment information image that is formed as a one-time payment security code based on a color pixel code, is continuously moved.

* * * * *